April 21, 1964   F. A. ROSENTHAL   3,129,922
SELF CENTERING RING SEAL
Filed Nov. 27, 1961
FIG.1.
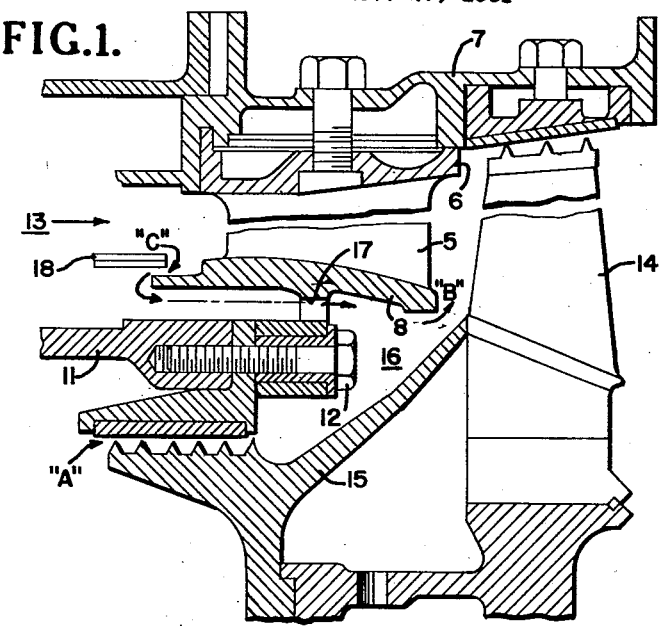
FIG.2.
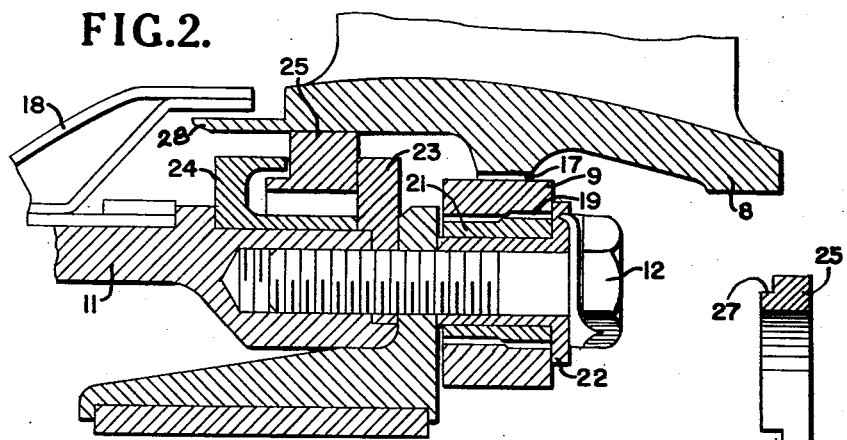
FIG.3.
FIG. 4.
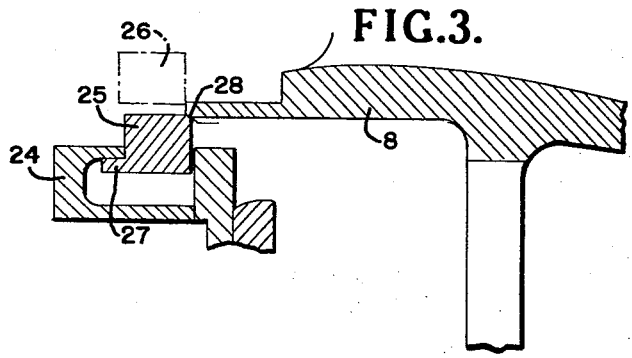
INVENTOR.
FREDERICK A. ROSENTHAL
BY *W. O. Quesenberry*
*O. Hodges* ATTYS.
*P. R. Harder* AGENT.

United States Patent Office 3,129,922
Patented Apr. 21, 1964

3,129,922
SELF CENTERING RING SEAL
Frederick A. Rosenthal, Export, Pa., assignor, by mesne assignments, to the United States of America as represented by the Secretary of the Navy
Filed Nov. 27, 1961, Ser. No. 155,222
7 Claims. (Cl. 253—78)

This invention generally relates to a turbojet engine and more particularly to a seal along the inner support of the stator vanes to prevent high pressure leakage through the support into an area where low air flow pressure is desired.

In the prior art it has been the general practice to rigidly secure the turbine nozzle outer shroud to the turbine casing and to provide the lower shroud of the turbine nozzle vane with a U-shaped end portion which is fitted about a bearing block secured to the turbine inner support. The bearing block assembly is provided with an eccentric bushing which allows the bearing block to be positioned adjacent the lower shroud within the U-shaped sections to a spacing of approximately 0.040″. Such an arrangement allows slight axial and radial movement of the turbine vane during engine operation due to the force of the combustion gases and the temperatures involved.

While such an arrangement has served its purpose, it has been found that high pressure gas from the combustion chamber leaks between the bearing block and the U-shaped portion of the lower shroud into an area within which a low pressure is desired. The high pressure leak between the bearing block and the lower shroud results in an unbalance of forces which results in a thrust load upon the turbine shaft bearings.

The general purpose of this invention is to provide a seal on the high pressure side of this leakage path which has a spring tension sufficient to seal the leakage path yet is arranged in such a manner so as to provide for ease of assembly during the turbine manufacturing process.

To accomplish this, a retaining ring is provided which circumscribes and is secured to the inner support within the area of the leakage path. A piston ring type seal is provided which has a cylindrical flange thereon that engages the retaining ring to restrain the piston ring thereby keeping the outer diameter under control during assembly and thus requiring only a nominal lead in chamfer on the lower shroud and thereby allowing the ring seal sufficient spring tension to provide an adequate sealing contact with the turbine nozzle lower shroud.

One object of this invention is, therefore, to provide a piston type seal ring for sealing the leakage path between the nozzle vane lower shroud and its bearing block.

Another object is the provision of a ring seal assembly which restrains the ring seal outer diameter thereby allowing ease of assembly of the main parts.

Another object is to provide a seal between the turbine nozzle lower shroud and the turbine inner support which allows relative movement of the lower shroud with respect to the inner support during engine operation.

Other objects and many of the attendant advantages of this invention will be more readily appreciated as the same becomes better understood by reference to the following detailed description when considered in connection with the accompanying drawing in which like reference numerals designate like parts throughout the views thereof and wherein:

FIG. 1 is a sectional view, partially broken away, of the portion of a turbojet engine illustrating the various air leakage passages;

FIG. 2 is a sectional view of the portion of a turbojet engine embodying the instant invention;

FIG. 3 illustrates the seal ring during assembly of the turbine nozzle vanes in the turbojet engine; and FIG. 4 is a view in section of the seal ring somewhat reduced.

Referring now to FIG. 1 there is illustrated a nozzle vane 5 having a radially outer shroud 6 rigidly secured to the turbine casing 7. The radially inner shroud 8 of vane 5 has a flat bottom U-shaped section which is fitted closely about the bearing block 9 which is secured to inner support 11 by bolt 12. High pressure gases from combustion chamber 13 are directed by the nozzle vane 5 onto the turbine blade 14, rotating the turbine blade 14 and the main shaft to which the turbine blade is secured. A labyrinth seal 15 provides a means for dropping or reducing the pressure from high pressure area "A" into chamber 16 within which a low pressure is desired.

It is desired that the pressure level in chamber 16 should ordinarily be the resultant pressure of the air from high pressure area "A" after the pressure drop across the seal 15 and the low static pressure at "B." However, due to the spacing 17 between the radially inner shroud 8 and the bearing block 9 to allow for expansion of the nozzle vane 5 during engine operation, high pressure gases at point "C" from combustion chamber 13 pass between the aft combustion chamber liner 18 and the forward extension of the radially inner shroud 8 as indicated by the arrows and through the spacing 17 into low pressure chamber 16. These high pressure gases from "C" into chamber 16 raise the pressure level therein and create a thrust loading on the main shaft bearings due to the increased pressure against the labyrinth seal 15.

Referring now to FIG. 2 there is illustrated in greater detail the radially inner shroud 8 and the bearing block 9. Within the bearing block and secured thereto by a plurality of serrations 19 is an eccentric bushing 21 having an eccentric hole therein. Within the eccentric bushing is a bearing bushing 22 having a concentric hole therein to receive the bolt 12. As has hereinbefore been described, the bearing block 9 is positioned within the U-shaped portion of the radially inner shroud 8 until an opening of approximately 0.040″ is present between the bearing block and the lower shroud portion at numeral 17. The eccentric bushing is then rotated until the hole therein aligns with the hole in the inner support 11 and bushing 21 is then dropped in place, being locked within bearing block 9 by the serrations 19. The concentric bushing 22 is then inserted within bushing 21 and bolt 12 secures the entire assembly to the inner support 11.

Further secured to the inner support by bolt 12 is a retaining ring 23 having a J-shaped portion 24 within which is secured the seal ring 25 which is utilized to seal the gas leakage path between points "C" and "B." The seal 25 abuts the radially inner shroud 8 along one edge thereof and the rear portion of retaining ring 23 along an adjacent edge. As is apparent to one skilled in the art, the spring tension of the ring seal 25 tends to force the ring against the radially inner shroud 8 and the high pressure gas from point "C" will maintain the seal tightly against the rear portion of retaining ring 23 thereby forming a seal within the passage and preventing leakage from high pressure area "C" to low pressure "B."

Referring now to FIG. 3 there is illustrated in phantom section 26 the ordinary, unrestrained position of a piston ring type seal having sufficient spring tension to maintain a seal between the radially inner shroud and the upper edge of the ring seal. As is apparent from the illustration such a position would greatly hinder the assembly of the turbine nozzle vane 5 and with the radially inner shroud 8 thereon. Therefore, ring seal 25 is provided with a cylindrical flange 27 along its lower edge which when unrestrained engages the upper portion of the J-shaped section 24 to compress the ring 25 to such a diameter that by slightly chamfering the forward edge of the radially inner shroud 8 as illustrated by surface 28 the ring seal 25 will be additionally compressed and forced inwardly as the turbine vanes are forced into position without the use of any special tools or equipment.

On FIG. 4 is shown a sectional view of the resilient ring seal 25 in an initial condition thereof before being compressed by the J-shaped section 24 engaging the cylindrical flange 27 formed thereon. The ring seal is split preferably as shown to render it self-expanding, the gap between the end portions of the ring seal being partially closed when the flange 27 is compressed by the J-shaped section 24 and somewhat additionally closed when the ring seal is forced into engagement with the inner cylindrical surface of the radially inner shroud 8 and disengaged from the J-shaped section during assembly.

It is important to note that the assembly about the radially inner shroud 8 must be such as to completely seal the gas passage yet allow for both axial and radial motion between the nozzle vanes and their support during engine operation. The seals illustrated and described herein not only allow this movement but also prevent gas leakage from the high pressure area to the low pressure area thereby maintaining proper bearing thrust loading which has been found to improve engine performance by several percent.

There has been illustrated and described a new and unique seal arrangement in combination with a turbojet engine which not only provides adequate sealing between the high pressure and low pressure areas but also further allows relative motion of the turbine nozzle vanes during engine operation and provides for ease in assembly of the mating parts.

Obviously many modifications and variations of the present invention are possible in light of the foregoing teachings. It is therefore to be understood, that within the scope of the appended claims, the invention may be practiced otherwise than as specifically described.

What is claimed as new and desired to be secured by Letters Patent of the United States is:

1. In a turbojet engine, the combination of an engine inner support, a radially inner nozzle vane shroud having an inner cylindrical surface and a support therefor secured to said inner engine support, said radially inner nozzle vane shroud support and said radially inner nozzle vane shroud having a leakage path therebetween, and a ring sealing assembly secured to the inner support, said ring sealing assembly having means frictionally engaging said cylindrical surface for sealing the leakage path, said means comprising a retaining ring, means securing said retaining ring to the inner support, and a split resilient sealing ring movably disposed within said retaining ring in such a manner as to tightly abut said retaining ring in sealed relation therewith and be radially compressed against the cylindrical surface of the radially inner shroud to form a seal between said retaining ring and the shroud.

2. The combination of claim 1 wherein the sealing ring has a cylindrical flange integrally formed on one edge thereof, said flange engaging said retaining ring to reduce and limit the outer diameter of said sealing ring seal during assembly and prior to the engagement of the sealing ring with said cylindrical surface.

3. The combination of claim 2 wherein said retaining ring has a J-shaped section for initially engaging said flange on said ring seal prior to the engagement of the sealing ring with said cylindrical surface.

4. In a turbojet engine, a radially outer shroud, an engine casing, means attaching said radially outer shroud to said casing, a plurality of nozzle vanes integrally formed with said radially outer shroud, a radially inner shroud integrally formed with said vanes and having an inner cylindrical surface formed thereon, an inner support, said inner support closely abutting said radially inner shroud, and resilient movable means carried by said inner support and abutting the inner surface of said radially inner shroud to seal the passage between said radially inner shroud and said inner support, said means comprising a retaining ring secured to said inner support, and a resilient split ring seal having a portion movably disposed within said retaining ring, and an outer cylindrical surface configured for engagement with the inner surface of said radially inner shroud.

5. The engine of claim 4 wherein said means further includes means on said ring seal engaging said retaining ring to limit the outer diameter of said ring seal during assembly and prior to engagement of the ring seal with said inner surface.

6. The engine of claim 5 wherein said last named means is a cylindrical flange integrally formed on said ring seal.

7. The engine of claim 6 wherein the leading edge of said inner surface is chamfered and said ring seal is engaged by said retaining ring in such a manner that said chamfer engages said ring seal to compress said seal during assembly of the engine sufficiently to engage said cylindrical surface.

References Cited in the file of this patent

UNITED STATES PATENTS

| 2,447,942 | Imbert et al. | Aug. 24, 1948 |
| 2,657,901 | McLeod | Nov. 3, 1953 |

FOREIGN PATENTS

| 1,103,348 | France | May 18, 1955 |
| 25,910 | Great Britain | 1907 |
| 834,178 | Great Britain | May 4, 1960 |